(12) United States Patent
Wang (10) Patent No.: US 9,783,033 B2
(45) Date of Patent: Oct. 10, 2017

(54) CAR AWNING (71) Applicant: SUZHOU SHARP-ROCK ENERGY DEVELOPMENT TECHNOLOGIES CO., LTD., Jiangsu (CN)

(72) Inventor: Ling Wang, Jiangsu (CN)

(73) Assignee: SUZHOU SHARP-ROCK ENERGY DEVELOPMENT TECHNOLOGIES CO., LTD., Jiangsu (CH)

( * ) Notice: Subject to any disclaimer, the term of this patent is extended or adjusted under 35 U.S.C. 154(b) by 0 days.

(21) Appl. No.: 14/916,073

(22) PCT Filed: Sep. 2, 2014

(86) PCT No.: PCT/CN2014/085786
§ 371 (c)(1),
(2) Date: Mar. 2, 2016

(87) PCT Pub. No.: WO2015/027964
PCT Pub. Date: Mar. 5, 2015

(65) Prior Publication Data
US 2016/0214472 A1 Jul. 28, 2016

(30) Foreign Application Priority Data

Sep. 2, 2013 (CN) .......................... 2013 1 0390798
Sep. 2, 2013 (CN) .......................... 2013 1 0391501

(51) Int. Cl.
B60J 11/02 (2006.01)
B60R 9/00 (2006.01)

(52) U.S. Cl.
CPC ................. B60J 11/02 (2013.01); B60R 9/00 (2013.01)

(58) Field of Classification Search
CPC .... B62D 21/152; B62D 25/02; B62D 25/082; B62D 21/02; B62D 21/157; B62D 25/025;
(Continued)

(56) References Cited

U.S. PATENT DOCUMENTS 4,805,654 A * 2/1989 Wang ...................... E04H 15/06
135/139
5,762,393 A 6/1998 Darmas, Sr.
(Continued)

FOREIGN PATENT DOCUMENTS

CN 100497020 6/2009
CN 101301849 6/2010
(Continued)

Primary Examiner — Glenn Dayoan
Assistant Examiner — Sunsurraye Westbrook
(74) Attorney, Agent, or Firm — Vidas Arrett & Steinkraus (57) ABSTRACT A car awning including a mounting frame, a main rolling mechanism and a hauling mechanism. The main rolling mechanism has a main rolling drum rotatably disposed on the mounting frame, two layers of first awning cloths are layered wound on the main rolling drum, and two first awning supporting poles connected to the two first awning cloths. The two first awning supporting poles are capable of moving towards opposite directions along a first path perpendicular to the axis of the main rolling drum. The hauling mechanism is used for hauling the two first awning supporting poles to move. By mounting the awning on the top of a car via the mounting frame, the car awning can shade sunshine for the car when the awning cloths are unfolded, and the car awning can be used as a luggage carrier when the awning cloths are rolled up.

17 Claims, 3 Drawing Sheets (58) Field of Classification Search
CPC ....... B62D 25/04; B60J 5/0437; B60J 5/0443; B60J 1/17; B60J 5/0427; B60J 5/0429; B60R 19/18; B60R 19/24; B60R 2019/1806; B60R 19/04; B60R 19/12; B60R 19/48; B60R 2019/1813
USPC .. 296/187.09, 146.6, 203.02, 192, 191, 209, 296/187.11, 193.09; 280/784, 788; 293/102, 117, 133, 154, 155; 180/274
See application file for complete search history.

(56) References Cited

U.S. PATENT DOCUMENTS

| | | | | |
|---|---|---|---|---|
| 6,318,393 | B1* | 11/2001 | Glasgo | B60J 11/00 135/88.05 |
| 6,935,674 | B1* | 8/2005 | Campos | B60J 11/00 296/136.1 |
| 7,311,112 | B2* | 12/2007 | Pacheco | B60J 11/02 135/88.05 |
| 7,337,793 | B2* | 3/2008 | Chen | B60J 11/02 135/117 |
| 7,562,928 | B1* | 7/2009 | Morazan | B60J 11/00 296/136.01 |
| 7,967,366 | B1* | 6/2011 | Tellez | B60J 11/02 296/136.02 |
| 2012/0261940 | A1 | 10/2012 | Gees | |

FOREIGN PATENT DOCUMENTS

| | | |
|---|---|---|
| CN | 102407760 | 4/2012 |
| CN | 202944190 | 5/2013 |
| CN | 103407353 | 11/2013 |
| CN | 103434375 | 12/2013 |
| CN | 203472493 | 3/2014 |
| CN | 203472494 | 3/2014 |

* cited by examiner

CAR AWNING

TECHNICAL FIELD

The present invention relates to a car awning which can be used as a luggage carrier of the car, and which is directly fixedly mounted at the luggage carrier position on the car roof or mounted at the middle of the luggage carrier got already.

BACKGROUND OF INVENTION

The car as an important means of transport is purchased and used by more and more customers. Due to that most of cars are parked at open area, on sunning days, particular in summer, cars are exposed to sunshine, and the temperature inside the cars is very high. In the one hand, when a driver or a passenger gets into a car, the car is short on comfort. On the other hand, in order to use the car rapidly and comfortably, people may usually open the air conditioner to reduce the temperature in the manner of burning energy and the running cost of the car is increased, which does not conform with the energy saving and environmental protection concept. In addition, the leather and sprayed paint inside the car under sunlight exposure are prone to release hazardous and harmful gas, and assembly units inside the car are apt to be oxidated. Therefore, sunshade for cars is very important. Presently, although there are already car awnings, they have the following shortcomings: 1. inconvenient for use and needed to place and detach repeatedly; 2. easy to be blown off, and not windproof; 3. easy to be stolen, and not theft-proof; 4. not integrated with the car itself, and affecting the appearance; 5. poor sunshade effect. Furthermore, only the sunshade of the car roof is taken into consideration, the sides of the car, especially the window locations, cannot be shielded effectively.

Chinese patent Publication No. 101797879A discloses a solar electric and remote control car cover, which comprises a threaded rod, a fixing seat of folding rod, a sleeve shell and a lift-up seat of folding rod, at least three folding arms connected with a shade cloth being provided between the fixing seat of folding rod and the lift-up seat of folding rod, the folding arms being formed by hinging two folding rods together, and the two folding rods being respectively hinged at the circular peripheral locations of the fixing seat of folding rod and the lift-up seat of folding rod. When the folding arms are unfolded, the shade cloths are unfolded accordingly to shade the sun and rain; when the folding arms are folded, the shade cloths are folded accordingly. The defects thereof are that: the shape of the awning after unfolded is an irregularly round umbrella shape, which can only cover the location from the car roof to the windows, and have a small sunshade area and poor effect of sun protection. Due to the special unfolding shape thereof, the awning is only suitable for the sedan car, and cannot be used for all kinds of vehicle models. Due to the several folding arms, the folded shade cloths occupy a large volume. The overall appearance is not good enough. And it is also inconvenient for use and needed to place and detach repeatedly, and the anti-thief property thereof is not perfect.

Chinese patent Publication No. 102555748A discloses a energy saving and remote control car awning, which is placed at the two ends of the car roof parallel to the car axle via a sucker, and which is unfolded and folded by rotating a rotatable cover 180 degree to drive a movable rod to move the awning. The defects thereof are that: a single awning after unfolded is semicircular in shape cannot cover the car body completely, and the sunshade area thereof is quite limited. There is no effective support between the two awnings, resulting in no effective sun protection at the car roof. The awning is not integrated with the car body, is needed to be mounted manually, and should be packed up and placed in the car trunk before running, inconvenient for use. The windproof and anti-thief property thereof is not perfect.

SUMMARY

Focusing on the above problems, the present invention is intended to provide a car awning which can be used as a luggage carrier or a part of a luggage carrier.

To solve the above technical problems, the present invention provides a car awning comprising a mounting frame, a main rolling mechanism and a hauling mechanism, the main rolling mechanism comprising a main rolling drum rotatably disposed on the mounting frame by its own axis, two layers of first awning cloths layered wound on the main rolling drum and two first awning supporting poles respectively connected to the outer ends of the two first awning cloths to respectively haul the two layers of first awning cloths to move. The two first awning supporting poles are capable of moving towards opposite directions along a first path perpendicular to the axis of the main rolling drum. The hauling mechanism is used for hauling the two first awning supporting poles to move.

In a preferable embodiment, the hauling mechanism comprises two pair of folding rods, an end of each pair of the folding rods being connected with the mounting frame, and the other ends thereof being respectively connected with the two first awning supporting poles; each of the folding rod comprises two crank arms capable of relatively folding up or stretching out and a spring provided between the two crank arms.

In a specific embodiment, the car awning further comprises a side rolling mechanism comprising two side rolling drums, two second awning cloths respectively wound on the two side rolling drums, and two second awning supporting poles respectively connected to the outer ends of the two second awning cloths to respectively haul the two second awning cloths to move, the two second awning supporting poles being respectively slidably connected to the two first awning supporting poles;

and a control mechanism comprising a first worm wheel rotatably provided on the mounting frame, a first worm driven by the first worm wheel, two second worm wheels rotatably provided on the two first awning supporting poles, and two second worms respectively driven by the two second worm wheels, wherein, the two side rolling drums are respectively rotatably connected to the first worm by their own axises, the two second worms are respectively connected to the two second awning supporting poles, and the rotation axises of the first worm wheels and the rotation axises of the second worm wheels are perpendicular to the axis of the main rolling drum, respectively.

Further, the number of the side rolling mechanism is two, and two groups of side rolling mechanisms are respectively located at two sides of the main rolling mechanism, the control mechanism further comprises another first worm driven by the first worm wheel and another two second worms respectively driven by the two second worm wheels, the thread directions of the first worms of the control mechanism are opposite, and the thread directions of the second worms of the control mechanism are opposite.

Further, a roll-up spring is provided on the side rolling drum for folding the second awning cloth, and the second awning cloth has a first end connected to the roll-up spring and a second end connected to the second awning supporting pole.

Further, the first worm wheel and the second worm wheel are driven by a second motor.

Further, the first awning cloth and the second awning cloth are opened with one or more through-holes.

Further, the width of the second awning cloth is 0.25~1 meter, and the unfolding length of single layer of the second awning cloth is 2~4 meters.

Preferably, a first transmission mechanism is provided on an end of the mounting frame, and the main rolling mechanism is driven by a first motor via the first transmission mechanism.

Preferably, the width of the first awning cloth is 2~3 meters, and the unfolding length of single layer of the first awning cloth is 2~4 meters.

In a specific embodiment, the car awning further comprises a shell, and the mounting frame, and the main rolling drum and the first awning cloth are provided below the shell.

In a specific embodiment, the car awning further comprises a base fixedly mounted on the roof of the car, and the mounting frame is connected to the base capable of rotating in a plane approximately parallel to the roof; the rotation of the mounting frame with respect to the base results in that the car awning has two states, a first state and a second state, when in the first state, the axis of the main rolling drum is basically parallel to the front-rear direction of the car, the first awning cloth is wound on the main rolling drum, and the main rolling mechanism and the mounting frame are used as a luggage carrier; when in the second state, the axis of the main rolling drum is perpendicular to the front-rear direction of the car, and the first awning cloth is unwound and unfolded.

Further, a rotary magnet is provided at the middle of the base, and the mounting frame is rotated by the rotary magnet.

the hauling mechanism comprises a support frame fixedly provided on the base, a worm wheel driven by a motor, two hauling rods meshing-driven by the worm wheel and two hauling cables respectively provided on the two hauling rods, the mounting frame is rotatably provided on the support frame and the main rolling drum is driven by the motor via the worm wheel; the axises of thread of the two hauling rods are parallel to each other and perpendicular to the axis of the worm wheel, the thread directions of the two hauling rods are opposite, and the hauling cables are provided on the hauling rods and the ends of the hauling cables are fixedly connected with the first awning supporting rod.

More specifically, a rotary magnet is provided at the middle of the support frame, and the mounting frame is rotated by the rotary magnet.

More specifically, a hauling wheel is rotatably provided on the hauling rod and driven by the motor or a winding motor, and the hauling cable is windingly provided on the hauling wheel.

More specifically, the width of the first awning cloth is 1~1.5 meters, and the unfolding length of single layer of the first awning cloth is 1~3 meters.

Due to the use of the above structures, the present invention has the following advantages: by mounting the awning on the roof of the car via the mounting frame, it is not needed to be installed and detached repeatedly, and has well windproof and anti-thief effect; there is a distance between the awning and the roof so that air can freely flow between the car body and the awning to prevent heat gathering between the car body and the awning, and well sun protection effect can be achieved; the unfolding and folding of the awning are convenient, fast and easy to operate.

wherein:

100. base; 1. main rolling mechanism; 10. mounting frame; 12. main rolling drum; 13. first awning cloth; 14. first awning supporting pole; 15. worm wheel and worm actuator;

2. hauling mechanism; 22 crank arm; 23. hinged shaft; 24 hinged support; 25. first worm wheel; 26. second worm wheel;

3. side rolling mechanism; 31. first worm; 32. second worm; 33. side rolling drum; 34. second awning cloth; 35. second awning supporting pole;

21. base; F. main rolling mechanism; 221. mounting frame; 222. main rolling drum; 223. first awning cloth; 224. first awning supporting pole; 22'. hauling mechanism; 231. support frame; 232. worm wheel; 233. hauling rod; 234. hauling cable; 235. hauling wheel; 236. rotary magnet.

DETAILED DESCRIPTION OF EMBODIMENTS

In the following, the preferable embodiments of the present invention are explained in detail combining with the accompanying drawings so that the advantages and features of the present invention can be easily understood by the skilled persons in the art, and thus it is clear to define the protective scope of the present invention.

Embodiment 1

Figure 1:
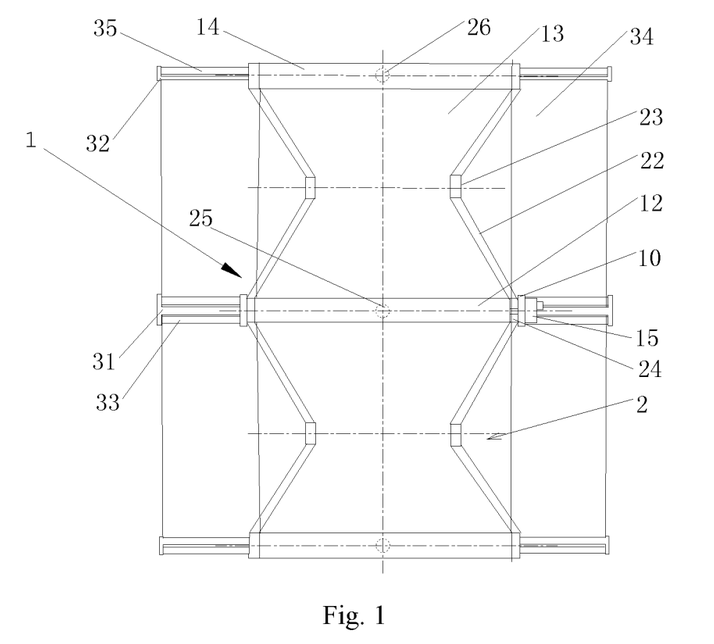
FIG. 1 is a structure schematic diagram of Embodiment 1 according to the present invention.
Figure 2:
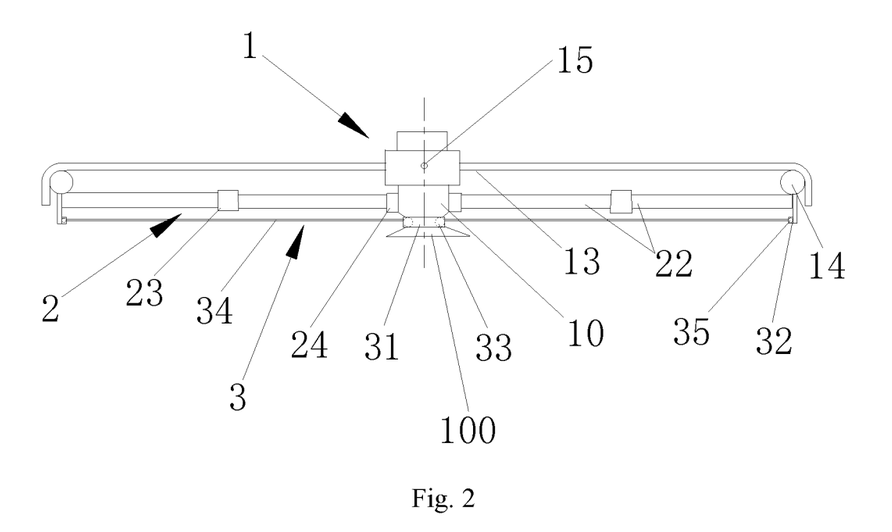
FIG. 2 is the side view of the structure shown in FIG. 1.

Referring to FIGS. 1 and 2, a car awning comprises:

A mounting frame 10 provided on the car roof, a main rolling mechanism 1 comprising a main rolling drum 12 rotatably disposed on the mounting frame 10 by its own axis, two layers of first awning cloths 13 layered wound on the main rolling drum 12 and two first awning supporting poles 14 for hauling the first awning cloths 13, the first awning cloths 13 having a first end wound on the main rolling drum 12 and a second end fixedly connected to the first awning supporting poles 14, the first awning supporting poles 14 being capable of moving along a direction vertical to the axis of the main rolling drum 12, and the moving directions of the two first awning supporting poles 14 being opposite;

a hauling mechanism 2 comprising two pair of folding rods respectively provided at the two sides of the mounting frame 10, an end of each folding rod being rotatably connected with the mounting frame 10, and the other ends thereof being rotatably connected with the first awning supporting poles 14, each folding rod comprising two crank arms 22 capable of relatively folding up or stretching out and a compressed spring (not shown) provided between the two crank arms 22.

In the present embodiment, the car awning further comprises a side rolling mechanism 3 comprising two side rolling drums 33, two second awning cloths 34 respectively wound on the two side rolling drums 33, and two second awning supporting poles 35 respectively connected to the outer ends of the two second awning cloths 34 to respectively haul the two second awning cloths 34 to move, the two second awning supporting poles 35 being respectively slidably connected to the two first awning supporting poles 14.

After the first awning cloths 13 of the main rolling mechanism 1 are unfolded, the second awning cloths 34 of the side rolling mechanism 3 is capable of unfolding towards the sides, and the unfolding is achieved via a control mechanism. The control mechanism comprises a first worm wheel 25 rotatably provided on the mounting frame 10, a first worm 31 driven by the first worm wheel 25, two second worm wheels 26 respectively rotatably provided on the two first awning supporting poles 14, and two second worms 32 respectively driven by the two second worm wheels 26. The two side rolling drums 33 are respectively rotatably connected to the first worm 31 by their own axises, the two second worms 32 are respectively connected to the two second awning supporting poles 35, and the rotation axises of the first worm wheels 25 and the rotation axises of the second worm wheels 26 are perpendicular to the axis of the main rolling drum 12, respectively.

The axis of thread of the first worms 25 and the axis of thread of the first worm 31 are perpendicular to each other, and the axis of thread of the second worms 26 and the axis of thread of the second worm 32 are perpendicular to each other. The side rolling mechanism 3 is mounted at the lower part of the mounting frame 10 and is movable along the length direction of the mounting frame 10 (perpendicular to the axis of the main rolling drum 12).

A roll-up spring (not shown) is provided on the side rolling drum 33 for folding the second awning cloth 34, and the second awning cloth 34 has a first end connected to the roll-up spring and a second end connected to the second awning supporting pole 35.

In the shown preferable embodiment, there are two side rolling mechanisms 3 which are respectively located at two sides of the main rolling mechanism 1. The thread directions of the first worms 31 are opposite, and the thread directions of the second worms 32 are opposite. When the first awning cloth 13 is unfolded over the car roof, the side rolling mechanisms 3 moves to the two sides of the car door, and the second awning supporting poles 35 drives the second awning cloths 34 to unfold and cover the two sides of the car.

A worm wheel and worm actuator 15 is provided on an end of the mounting frame 10, and the main rolling drum 12 is driven by a motor (not shown) via the worm wheel and worm actuator 15.

The first worm wheel 25 and the second worm wheel 26 are driven by a second motor which is preferably a synchronous motor.

The mounting frame 10 is fixedly mounted on the car roof along a direction vertical to the front-rear direction of the car. The "front-rear direction" referred herein and elsewhere is defined according to the custom of the skilled persons in the art, that is, the front-rear direction conventionally conceived. The car awning can be used as a luggage carrier when the main rolling mechanism 1 and the side rolling mechanisms 3 are in the folded state.

The two ends of the folding rods are rotatably connected with the mounting frame 10 and the first awning supporting pole 14 via a hinged support 24, respectively, and the two crank arms 22 are rotatably connected via a hinged shaft 23.

The first awning cloth 13 and the second awning cloth 14 are opened with one or more through-holes.

The width of the first awning cloth 13 is 2~3 meters, and the unfolding length of single layer of the first awning cloth 13 is 2~4 meters.

The width of the second awning cloth 34 is 0.25~1 meter, and the unfolding length of single layer of the second awning cloth 34 is 2~4 meters.

A shell is provided outside the main rolling mechanism 1, and the mounting frame 10, and the main rolling drum 12 and the first awning cloth 14 are provided below the shell. When the main rolling mechanism and the side rolling mechanisms are in the folded state, the appearance of the car awning is similar to a luggage carrier. The luggage carriers in the prior art are mostly hollow, and the luggage carrier according to the present invention is solid because of comprising the rolling drum wound by the awning cloths. In contrast, the awning of the present invention being taken as a luggage carrier has a better load-bearing property.

The operating principle of the car awning according to the present invention is as follow:

When the car is going to run, the awning is folded, the first worm wheel and the second worm wheel rotates along a direction by being driven by the second motor, the first worms of the two side rolling mechanisms move towards the middle of the mounting frame and drive the side rolling drums to fold, and the second worms move towards the middle of the first awning supporting poles and drive the second awning supporting poles to fold. Meanwhile, the first motor drives the worm wheel and worm actuator to rotate the main rolling drum along a direction so as to fold and wind the first awning cloth, the first awning supporting pole hauls the folding rods to fold the two crank arms with respect to each other, the compressed spring is compressed, the second awning supporting pole moves towards the mounting frame along with the first awning supporting pole, and at the same time, under the action of contraction force of the roll-up spring of the side rolling drum, the second awning cloth is wound on the side rolling drum, and the car awning can be used as a luggage carrier.

When the car is going to stop, the awning is unfolded, the first worm wheel and the second worm wheel rotates along another direction by being driven by the second motor, the first worms of the two side rolling mechanisms move towards the end of the mounting frame and bring the side rolling drums to the top of two sides of the car, and the second worms move towards the end of the first awning supporting poles and bring the second awning supporting poles to the top of two sides of the car. Meanwhile, the first motor drives the worm wheel and worm actuator to rotate the main rolling drum along another direction so as to release the first awning cloth, and the resetting force of the compressed spring pushes the two crank arms to open and drives the first awning supporting pole to move facing away from the main rolling drum so as to spread the first awning cloth over the car roof. And along with the moving of the first awning supporting pole, the second awning supporting pole connected to the first awning supporting pole via the second worm moves facing away from the side rolling drum, the roll-up spring is stretched, and the second awning cloth is unfolded on the top of two sides of the car to shade the car.

The two side of the mounting frame described herein specifically refers to the upper and lower side of FIG. 1, and an end of the mounting frame refers to one end of the left side and the right side.

Embodiment 2

Figure 3:
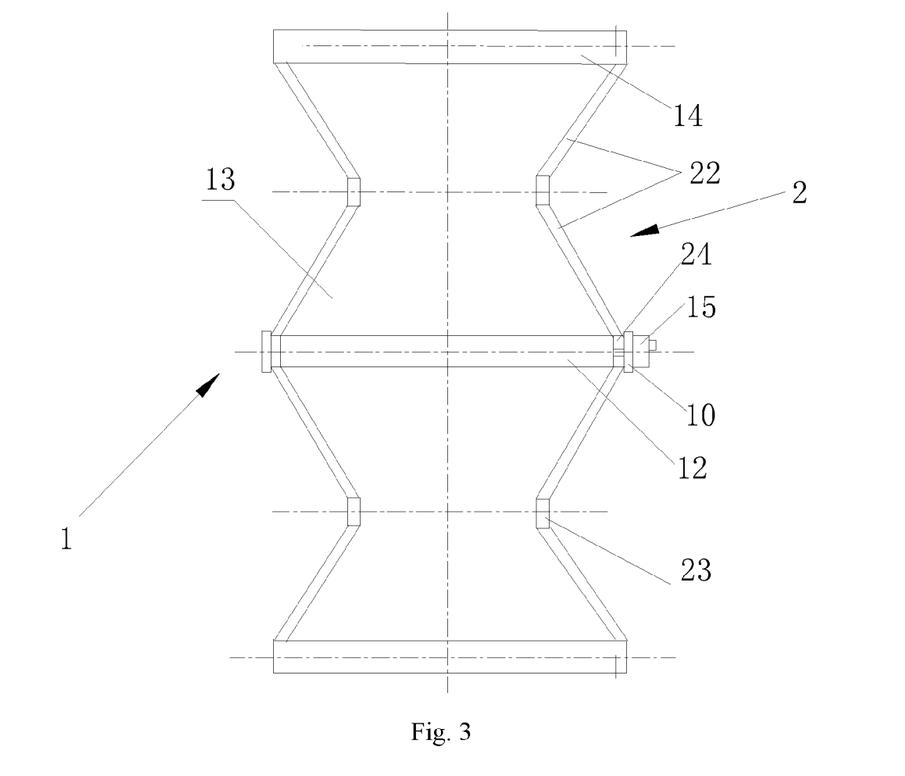
FIG. 3 is a structure schematic diagram of Embodiment 2 according to the present invention.
Figure 4:
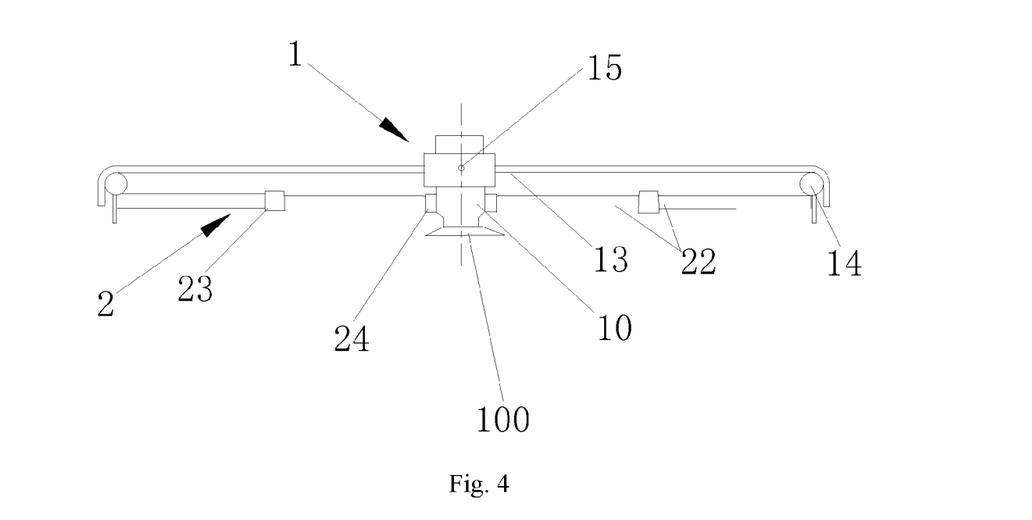
FIG. 4 is the side view of the structure shown in FIG. 3.

As shown in FIG. 3-4, the structure of this embodiment is similar to the above embodiment, by differing in that: the awning of this embodiment does not have a side rolling mechanism and the mounting frame 10 is not fixed on the car roof, instead, a base 100 is fixedly mounted on the car roof, and the mounting frame 10 is rotatably connected with the base 100, and the mounting frame 10 is capable of rotating in a plane approximately parallel to the roof.

Moreover, the awning according to the present embodiment is preferably mounted on the car roof in the manner of two groups, and the two groups of awnings are parallelly provided on the two sides of the car roof.

The base 100 may be fixed on the car roof via a screw.

By the rotation of the mounting frame 10 with respect to the base 100 results in that the car awning has at least two states, a first state and a second state, when in the first state, the axis of the main rolling drum 12 is basically parallel to the front-rear direction of the car, the first awning cloth 13 is wound on the main rolling drum 12, and the main rolling mechanism 1 and the mounting frame 10 are used as a luggage carrier; when in the second state, the axis of the main rolling drum 12 is perpendicular to the front-rear direction of the car, and the first awning cloth 13 is unfolded over the car roof to cover the car.

Specifically, the switch of the first state and the second state of the car awning may be driven by a vehicle power supply, solar battery or storage battery, or may be controlled by a remote control device.

The rotation of the mounting frame 10 may be driven by a rotary magnet (not shown), and specifically, the rotary magnet is a 90 degree rotary magnet and may be remote controlled.

In this embodiment, the width of the first awning cloth 13 is preferably 1~1.5 meters, and the unfolding length of single layer of the first awning cloth 13 is 1~3 meters. Specifically, depending on the vehicle type, besides covering the car body, the unfolded first awning cloth may exceed the car body about 50 centimeters to shade the sides of the car.

A shell is provided outside the main rolling mechanism 1, and as described in Embodiment 1, the mounting frame 10, and the main rolling drum 12 and the first awning cloth 13 are provided below the shell such that the appearance of the car awning is similar to a luggage carrier when car awning is in the first state. The luggage carriers in the prior art are mostly hollow, and the luggage carrier according to the present invention is solid because of comprising the rolling drum wound by the awning cloths. In contrast, the awning of the present invention being taken as a luggage carrier has a better load-bearing property.

The operating principle of the present embodiment is as follow: when the car is going to run, that is to say, the awning is switched to the first state from the second state, the motor drives the worm wheel and worm actuator 15 to rotate the main rolling drum 12 along a direction so as to fold and wind the first awning cloth 13, the first awning supporting pole 14 hauls the folding rods to fold the two crank arms 22 with respect to each other, the compressed spring is compressed, and until the crank arms 22 are folded completely and the first awning cloth 13 is wound on the main rolling drum 12, the rotary magnet is controlled to be switched on to rotate the hauling mechanism 2 and the main rolling mechanism 1 for 90 degree, and at this time, the axis of the main rolling drum 12 is parallel to the front-rear direction of the car, and the main rolling mechanism 1 can be used as a luggage carrier. When the car is going to stop, that is to say, the awning is switched to the second state from the first state, the motor drives the worm wheel and worm actuator 15 to rotate the main rolling drum 12 along another direction so as to release the first awning cloth 13, and meanwhile, the resetting force of the compressed spring pushes the two crank arms 22 to open and drives the first awning supporting pole 14 to move facing away from the main rolling drum 12 so as to spread the first awning cloth 13 over the car roof until the compressed spring restores to the initial position, and the first awning cloth 13 is unfolded on the top of the car to shade the car.

Embodiment 3

Figure 5:
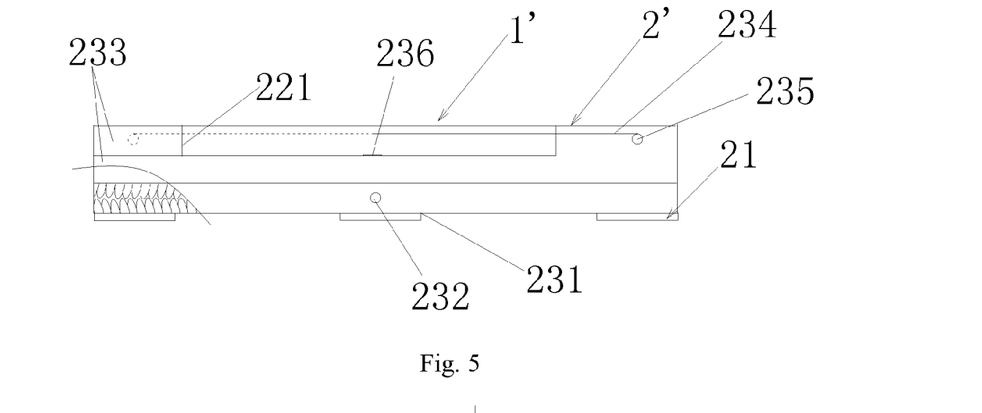
FIG. 5 is a structure schematic diagram of Embodiment 3 according to the present invention.
Figure 6:
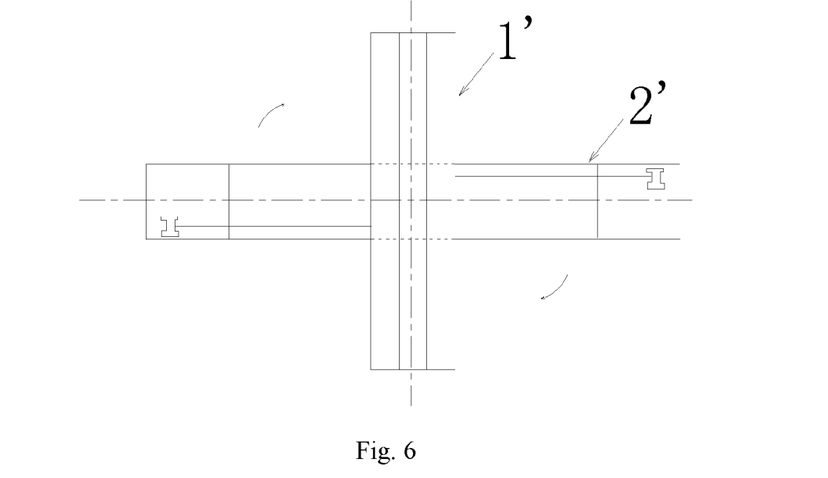
FIG. 6 is a schematic diagram showing the rotation manner of the main rolling mechanism in Embodiment 3.
Figure 7:
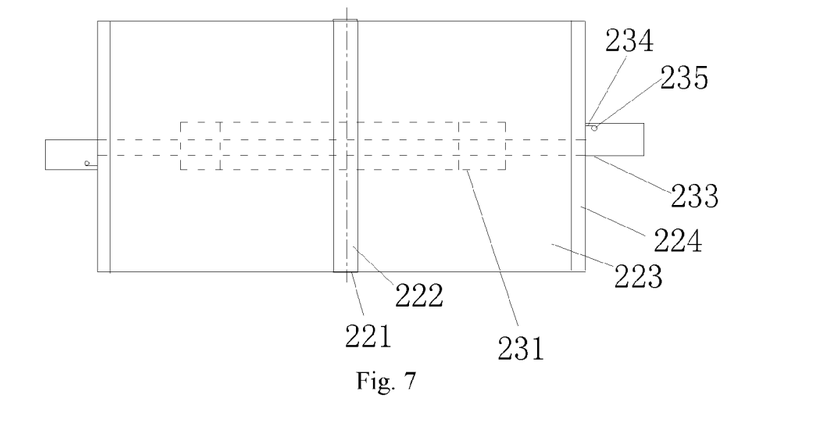
FIG. 7 is a structure schematic diagram of Embodiment 3 in the second state according to the present invention.

As shown in FIGS. 5-7, the car awning comprises:
a base 21 fixedly mounting on the car roof, specifically, by a screw fixing connection;
a main rolling mechanism 1' capable of rotating in a plane approximately parallel to the roof with respect to the car, comprising a main rolling mechanism mounting frame 221, a main rolling drum 222 rotatably disposed on the main rolling mechanism mounting frame 221 by its own axis, two layers of first awning cloths 223 layered wound on the main rolling drum 222 and two first awning supporting poles 224 for hauling the first awning cloths 223, the first awning cloths 223 having a first end wound on the main rolling drum 222 and a second end fixedly connected to the first awning supporting poles 224, the first awning supporting poles 224 being capable of moving along a direction vertical to the axis of the main rolling drum 222, and the moving directions of the two first awning supporting poles 224 being opposite;
a hauling mechanism 2' provided on the base 21 and used for hauling the two first awning supporting poles 224 to move;
the main rolling mechanism 1' is provided on the hauling mechanism 2', and the multi-functional car awning has two states, a first state and a second state, when in the first state, the axis of the main rolling drum 222 is parallel to the heading direction of the car, the first awning cloth 223 is wound on the main rolling drum 222, and the main rolling mechanism 1' is used as a luggage carrier; when in the second state, the axis of the main rolling drum 222 is perpendicular to the heading direction of the car, and the first awning cloth 223 is unfolded over the car roof to cover the car. Specifically, the switch between the first state and the second state of the multi-functional car awning may be driven by a vehicle power supply, solar battery or storage battery, or may be controlled by a remote control device.

The hauling mechanism 2' comprises a support frame 231 fixedly provided on the base 21, a worm wheel 232 driven by a motor, two hauling rods 233 meshing-driven by the worm wheel 232 and two hauling cables 234 respectively provided on the two hauling rods 233, the main rolling mechanism mounting frame 221 is rotatably provided on the support frame 231 and the main rolling drum 222 is driven by the motor via the worm wheel 232; the axises of thread of the two hauling rods 233 are parallel to each other and perpendicular to the axis of the worm wheel 232, the thread directions of the two hauling rods 233 are opposite, and the hauling cables 234 are provided on the hauling rods 233 and the ends thereof are fixedly connected with the first awning supporting rod 224. The motor is a synchronous motor.

A rotary magnet 236 is provided at the middle of the support frame 231, and the main rolling mechanism mounting frame 221 is mounted on the rotary magnet 236. The rotary magnet is a 90 degree rotary magnet and may be remote controlled.

A hauling wheel 235 is rotatably provided on the hauling rod 233 and driven by the motor, and the hauling cable 234 is windingly provided on the hauling wheel 235 and an end thereof is fixedly connected with the first awning supporting rod 224. The hauling wheel 235 and the worm 232 may be driven by the same motor, or be respectively driven by two separate motor.

The first awning cloth 223 is provided with several through-holes such that air between the car body and the awning can flow outwards to prevent heat gathering on the car roof, and heat dissipation effect is well.

The width of the first awning cloth 223 is 1~1.5 meters, and the unfolding length of single layer of the first awning cloth 13 is 1~3 meters. Specifically, depending on the vehicle type, besides covering the car body, the unfolded first awning cloth may exceed the car body about 50 centimeters to shade the sides of the car.

A shell is provided outside the main rolling mechanism 1', and the mounting frame 221, and the main rolling drum 222 and the first awning cloth 223 are provided below the shell such that the appearance of the car awning is similar to a luggage carrier when car awning is in the first state. The luggage carriers in the prior art are mostly hollow, and the luggage carrier according to the present invention is solid because of comprising the rolling drum wound by the awning cloths. In contrast, the awning of the present invention being taken as a luggage carrier has a better load-bearing property.

The operating principle of the present embodiment is as follow: when the car is going to run, that is to say, the awning is switched to the first state from the second state, the motor drives the worm wheel 232 to rotate along a direction and the worm wheel 232 rotates two hauling rods 233 along two opposite directions towards the main rolling drum 222, and the hauling cables 234 hauls the first awning supporting pole 224, until the first awning cloth 223 is wound on the main rolling drum 222 completely, the rotary magnet 236 is controlled to be switched on, and the main rolling mechanism 1' is rotated for 90 degree, and the main rolling mechanism 1' can be used as a luggage carrier. When the car is going to stop, that is to say, the awning is switched to the second state from the first state, the rotary magnet 236 is controlled to be switched on, and the main rolling mechanism 1' is rotated for 90 degree, and at the time, the axis of the main rolling drum 222 is vertical to the heading direction of the car, the motor drives the worm wheel 232 to rotate along another direction and the worm wheel 232 rotates two hauling rods 233 along two opposite directions facing away from the main rolling drum 222, and along with the hauling cables 234 hauling the first awning supporting pole 224, the first awning cloth 223 is unfolded on the car roof to shade the car.

In addition, the car awning according to the present invention is preferably mounted on the car roof in the manner of two groups, and the two groups of awnings are parallelly provided on the two sides of the car roof, and the structure of the two groups of awning may be varied according to the concept of the present invention. For example, the hauling mechanism in the two awnings may employ different structures, and no more description is detailed herein.

The embodiments described above are only for illustrating the technical concepts and features of the present invention, are preferable embodiments and intended to make those skilled in the art being able to understand the present invention and thereby implement it, and should not be concluded to limit the protective scope of this invention. Any equivalent variations or modifications according to the spirit of the present invention should be covered by the protective scope of the present invention.

What is claimed is:

1. A car awning comprising:
   a mounting frame;
   a main rolling mechanism comprising a main rolling drum rotatably disposed on the mounting frame by its own axis, two layers of first awning cloths layered wound on the main rolling drum, and two first awning supporting poles respectively connected to the outer ends of the two first awning cloths to respectively haul the two first awning cloths to move, the two first awning supporting poles being capable of moving towards opposite directions along a first path perpendicular to the axis of the main rolling drum;
   a hauling mechanism for hauling the two first awning supporting poles to move; and
   a side rolling mechanism comprising two side rolling drums, two second awning cloths respectively wound on the two side rolling drums, and two second awning supporting poles respectively connected to the outer ends of the two second awning cloths to respectively haul the two second awning cloths to move, the two second awning supporting poles being respectively slidably connected to the two first awning supporting poles.

2. The car awning according to claim 1 wherein the hauling mechanism comprises two pair of folding rods, an end of each pair of the folding rod being connected with the mounting frame, and the other end thereof being respectively connected with the two first awning supporting poles; each of the folding rod comprises two crank arms capable of relatively folding up or stretching out and a spring provided between the two crank arms.

3. The car awning according to claim 1, further comprising
   a control mechanism comprising a first worm wheel rotatably provided on the mounting frame, a first worm driven by the first worm wheel, two second worm wheels respectively rotatably provided on the two first awning supporting poles, and two second worms respectively driven by the two second worm wheels, wherein, the two side rolling drums are respectively rotatably connected to the first worm by their own axes, the two second worms are respectively connected to the two second awning supporting poles, and the rotation axis of the first worm wheel and the rotation axes of the second worm wheels are perpendicular to the axis of the main rolling drum, respectively.

4. The car awning according to claim 3 wherein the number of the side rolling mechanism is two, and two groups of side rolling mechanisms are respectively located at two sides of the main rolling mechanism, the control mechanism further comprises another first worm driven by the first worm wheel and another two second worms respectively driven by the two second worm wheels, the thread directions of the first worms of the control mechanism are opposite, and the thread directions of the second worms of the control mechanism are opposite.

5. The car awning according to claim 3 wherein a roll-up spring is provided on the side rolling drum for folding the second awning cloth, and the second awning cloth has a first end connected to the roll-up spring and a second end connected to the second awning supporting pole.

6. The car awning according to claim 3 wherein the first worm wheel and the second worm wheel are driven by a second motor.

7. The car awning according to claim 3 wherein the first awning cloth and the second awning cloth are opened with one or more through-holes.

8. The car awning according to claim 3 wherein the width of the second awning cloth is between about 0.25 to about 1 meter, and the unfolding length of single layer of the second awning cloth is between about 2 to about 4 meters.

9. The car awning according to claim 1 wherein a first transmission mechanism is provided on an end of the mounting frame, and the main rolling mechanism is driven by a first motor via the first transmission mechanism.

10. The car awning according to claim 1 wherein the width of the first awning cloth is between about 2 to about 3 meters, and the unfolding length of single layer of the first awning cloth is between about 2 to 4 meters.

11. The car awning according to claim 1, further comprising a shell, and the mounting frame, and the main rolling drum and the first awning cloth are provided below the shell.

12. The car awning according to claim 1, further comprising a base fixedly mounted on the roof of the car, and the mounting frame is connected to the base capable of rotating in a plane approximately parallel to the roof; the rotation of the mounting frame with respect to the base results in that the car awning has two states, a first state and a second state, when in the first state, the axis of the main rolling drum is basically parallel to the front-rear direction of the car, the first awning cloth is wound on the main rolling drum, and the main rolling mechanism and the mounting frame are used as a luggage carrier; when in the second state, the axis of the main rolling drum is perpendicular to the front-rear direction of the car, and the first awning cloth is unwound and unfolded.

13. The car awning according to claim 12 wherein a rotary magnet is provided at the middle of the base, and the mounting frame is rotated by the rotary magnet.

14. The car awning according to claim 12 wherein the hauling mechanism comprises a support frame fixedly provided on the base, a worm wheel driven by a motor, two hauling rods meshing-driven by the worm wheel and two hauling cables respectively provided on the two hauling rods, the mounting frame is rotatably provided on the support frame and the main rolling drum is driven by the motor via the worm wheel; the axes of thread of the two hauling rods are parallel to each other and perpendicular to the axis of the worm wheel, the thread directions of the two hauling rods are opposite, and the hauling cables are provided on the hauling rods and the ends of the hauling cables are fixedly connected with the first awning supporting rod.

15. The car awning according to claim 14 wherein a rotary magnet is provided at the middle of the support frame, and the mounting frame is rotated by the rotary magnet.

16. The car awning according to claim 14 wherein a hauling wheel is rotatably provided on the hauling rod and driven by the motor or a winding motor, and the hauling cable is windingly provided on the hauling wheel.

17. The car awning according to claim 12 wherein the width of the first awning cloth is between about 1 to about 1.5 meters, and the unfolding length of single layer of the first awning cloth is between about 1 to about 3 meters.

* * * * *